(12) United States Patent
Matthias et al.

(10) Patent No.: US 11,813,658 B2
(45) Date of Patent: Nov. 14, 2023

(54) METHOD FOR PRODUCING A HOLLOW VALVE FOR INTERNAL COMBUSTION ENGINES

(71) Applicant: FEDERAL-MOGUL VALVETRAIN GMBH, Barsinghausen (DE)

(72) Inventors: Thorsten Matthias, Garbsen (DE); Antonius Wolking, Barsinghausen (DE); Johannes Knust, Hannover (DE)

(73) Assignee: Federal-Mogul Valvetrain GmbH, Barsinghausen (DE)

( * ) Notice: Subject to any disclaimer, the term of this patent is extended or adjusted under 35 U.S.C. 154(b) by 200 days.

(21) Appl. No.: 17/437,762

(22) PCT Filed: Feb. 10, 2020

(86) PCT No.: PCT/EP2020/053348
§ 371 (c)(1),
(2) Date: Sep. 9, 2021

(87) PCT Pub. No.: WO2020/182387
PCT Pub. Date: Sep. 17, 2020

(65) Prior Publication Data
US 2022/0168798 A1    Jun. 2, 2022

(30) Foreign Application Priority Data
Mar. 12, 2019   (DE) ............. 10 2019 106 214.4

(51) Int. Cl.
*B21D 53/84*   (2006.01)
*B21K 1/22*    (2006.01)
*F01L 3/20*    (2006.01)
*B21D 51/10*   (2006.01)
*B23P 15/00*   (2006.01)

(52) U.S. Cl.
CPC ............. *B21D 53/84* (2013.01); *B21D 51/10* (2013.01); *B21K 1/22* (2013.01); *B23P 15/002* (2013.01); *F01L 3/20* (2013.01); *F01L 2303/00* (2020.05); *F01L 2303/01* (2020.05)

(58) Field of Classification Search
CPC ........ B21D 53/84; B21D 51/10; B21D 51/16; B21D 22/16; B21K 1/22; B23P 15/002; F01L 3/20; F01L 2303/00; F01L 2303/01; F01L 3/14; B21H 1/18; B21H 7/00
See application file for complete search history.

(56) References Cited

U.S. PATENT DOCUMENTS 6,006,713 A    12/1999   Gebauer
11,536,167 B2 *  12/2022   Kunitake .................. F01L 3/14
(Continued)

FOREIGN PATENT DOCUMENTS

CN     104791040 A      7/2015
DE     102010051871 A1  5/2012
(Continued)

*Primary Examiner* — Ryan J. Walters
(74) *Attorney, Agent, or Firm* — Robert L. Stearns; Dickinson Wright PLLC

(57) ABSTRACT

A method for producing a valve body of a hollow valve includes providing a workpiece blank or semi-finished product, spin extruding the workpiece to produce a preform having a cup with a hollow shape formed by the cup wall. A hollow valve produced by this method is also provided.

8 Claims, 2 Drawing Sheets

(56) References Cited

U.S. PATENT DOCUMENTS

| | | | | |
|---|---|---|---|---|
| 11,654,471 B2* | 5/2023 | Matthias | ................. | B21K 1/22 29/888.4 |
| 2009/0020082 A1 | 1/2009 | Suzuki et al. | | |
| 2014/0033533 A1* | 2/2014 | Morii | ...................... | B21K 1/22 29/890.12 |
| 2014/0366373 A1* | 12/2014 | Morii | ...................... | F01L 3/14 29/888.451 |

FOREIGN PATENT DOCUMENTS

| | | |
|---|---|---|
| DE | 102015118495 A1 | 5/2017 |
| EP | 0898055 A1 | 2/1999 |
| EP | 2325446 A1 | 5/2011 |
| EP | 2811126 A1 | 12/2014 |
| GB | 461940 A | 2/1937 |
| JP | 1995102917 A | 4/1997 |
| WO | 2019/001781 A1 | 1/2019 |
| WO | 2020004286 A1 | 1/2020 |

* cited by examiner

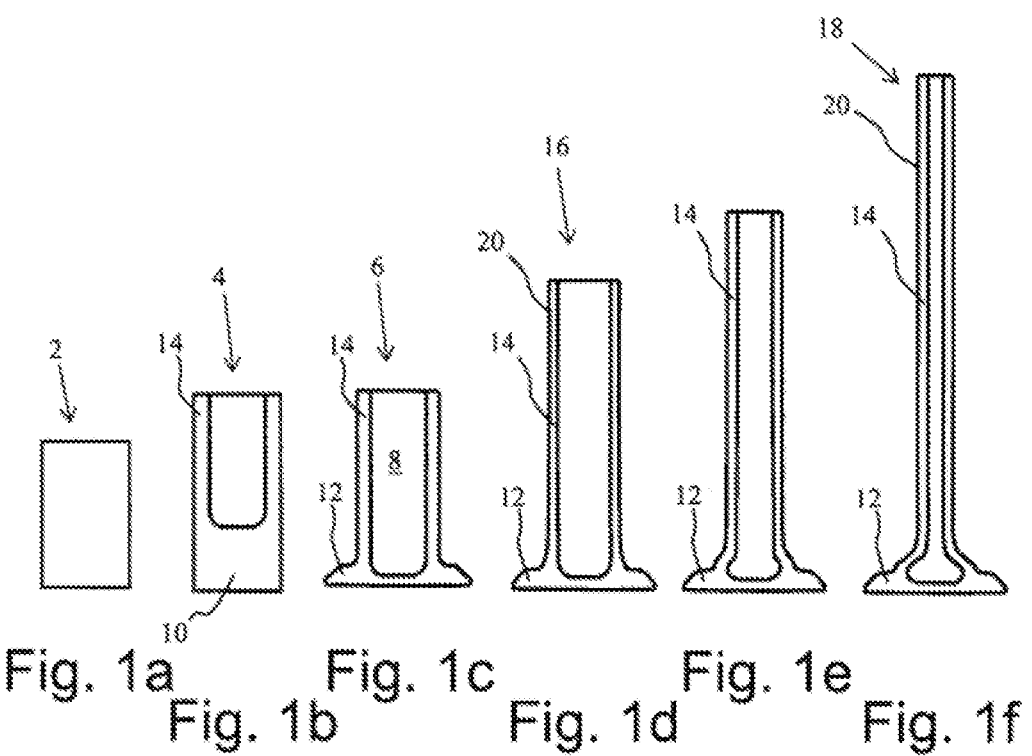

METHOD FOR PRODUCING A HOLLOW VALVE FOR INTERNAL COMBUSTION ENGINES

BACKGROUND

1. Technical Field

The present invention relates to a method for producing hollow valves or cavity valves, respectively, for internal combustion engines and hollow valves produced therewith.

2. Related Art

In internal combustion engines, inlet and outlet valves are components, which are thermally and mechanically highly stressed. A sufficient cooling is thus necessary in order to ensure a permanent functionality of the valves. Poppet valves are advantageous thereby compared to full shaft valves and hollow shaft valves (i.e. a hollow valve, in the case of which a hollow space is provided only in the shaft), because a hollow space is present in the shaft as well as in the valve head, whereby an improved internal cooling can be achieved by means of a cooling medium, e.g. sodium. Further advantages are a lower weight, the avoidance of hot spots, and a $CO_2$ reduction.

Hollow valves are usually produced by a combination of different methods, such as, e.g., forging, turning, and welding. In particular the turning or milling of the hollow space is cost-intensive thereby. Welding points at the plate surface or at other points, which are critical for operational reasons, should also be avoided. A further disadvantage of known methods is that a large number of process steps is often necessary, such as, e.g., in EP 2325446 A1. However, quick forming processes are advantageous for the cost-efficient production of large quantities.

For example, EP 0898055 A1 and U.S. Pat. No. 6,006,713 A describe a poppet valve, which is produced by closing a hollow blank by means of welding (friction welding, laser welding) or hard-facing. CN 104791040 A and JP 1995102917 are further publications, which deal with the production of cavity valves.

However, large wear problems arise during this manufacture due to the high-alloyed valve steels. A very high wear occurs at the tool, in particular the molding die, during the production of the valve preform. This means a short service life and high tool costs.

Known methods for producing cavity valves with uneven inner shaft geometries are shown in US 2009002082 by the use of inserts over the bored plate surface, and in DE 102010051871 A1 by the creation by means of an EMC method.

It is thus an object of the present invention to provide a production method for hollow valves or for a valve body, respectively, for hollow valves, which does not have the mentioned disadvantages and which simultaneously has a high productivity, good material utilization, and quick forming processes.

It is a further object of the present invention to adapt the production method such that the wear at the tool is reduced.

SUMMARY OF THE INVENTION

The method for producing a valve body of a hollow valve comprises the steps of providing a workpiece, i.e. blank or semi-finished product, and the spin extrusion of the workpiece to create a preform, which has a cup comprising a hollow mold formed by the cup wall.

According to an aspect of the present invention, the spin extrusion can be carried out by means of a molding die, which is pushed against the workpiece with an axial force, and at least one flow forming roll, which is pushed onto the workpiece with a radial force.

According to an aspect of the present invention, the preform can have a valve head/plate and a valve shaft comprising a shaft diameter, which is reduced compared to the valve plate.

According to an aspect of the present invention, the at least one flow forming roll can be arranged with respect to the molding die such that its radial force is applied between the tip and a thickest diameter or therebetween.

According to an aspect of the present invention, the workpiece can be received in a workpiece holder at a spindle and can rotate around its longitudinal axis, and the molding die can rotate synchronously to the spindle.

According to an aspect of the present invention, the at least one flow forming roll and the molding die can synchronously carry out an axial movement.

According to an aspect of the present invention, the method can be carried out as cold, warm, or hot forming.

According to an aspect of the present invention, the shaft diameter can be further reduced in a further process step by means of necking, rotary swaging, retracting, flow forming, or axial feed transverse rolling of the preform after the spin extrusion.

According to an aspect of the present invention, the cross section of the hollow mold can be circular or can have a follower profile, such as curve of constant width, ellipsis, polygon, or axially oriented multiple spline and toothing profiles.

According to an aspect the invention, the problem is furthermore solved by means of a hollow valve, which comprises a valve body, which was produced by using the above method.

BRIEF DESCRIPTION OF THE DRAWINGS

Exemplary embodiments of the invention will be described in more detail below with reference to the figures, wherein FIGS. 1a-1f show different intermediate steps of the production according to an embodiment of the invention of a valve body of a hollow valve (illustrated in FIG. 1d or FIG. 1f, respectively) from a blank (illustrated in FIG. 1a)

Figure 2B:
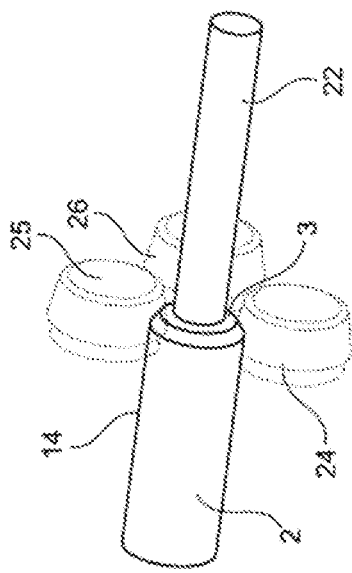
FIGS. 2a, 2b, 2c show a method step of the spin extrusion in a 3D view.

Hereinafter, identical reference numerals will be used in the description as well as in the drawing for identical or similar elements or components. A list of reference numerals is moreover specified, which is valid for all figures. The embodiments illustrated in the figures are only schematic and do not necessarily represent the actual size ratios.

DETAILED DESCRIPTION

Different intermediate stages of the production method according to an embodiment of the invention are illustrated in FIGS. 1A to 1F in sectional views, whereby optional or preferred production steps/intermediate stages, respectively, are also illustrated.

A blank 2 made of a valve steel, which is known to the person of skill in the art, preferably serves as starting point, see FIG. 1a. The blank has an at least partially cylindrical shape, preferably a circular cylindrical shape, according to the circular shape of the valve body or valve, respectively, which is to be produced.

The blank 2 is formed into a cup-shaped semi-finished product (or workpiece, respectively) 4, which is illustrated in FIG. 1b. The semi-finished product 4 in the shape of a cup comprises a base section 10, from which a valve head (or valve plate, respectively) 12 is formed later, and a tubular wall (or ring-shaped wall, respectively) 14, which surrounds a cylindrical, preferably circular cylindrical, cavity 8 of the cup-shaped semi-finished product 4, and from which a valve shaft 20 is formed later. Material can thereby possibly flow between base section 10 and tubular wall 14 during the subsequent forming steps.

As an alternative, the cup-shaped semi-finished product 4 can be provided directly; the method then thus starts by providing the cup-shaped semi-finished product 4, which is illustrated in FIG. 1b.

The valve head 12 is molded from the base section 10 in a subsequent forming step. A preform 6 of the valve body obtained thereby is illustrated in FIG. 1c.

The forming of the blank 2 into a cup-shaped workpiece 4 as well as the molding of the valve head 12 from the base section 10 can be carried out, e.g., by means of a hot or cold forming process. Extrusion or forging is preferably used. During the extrusion, a die is pressed into the blank 2 or the semi-finished product 4, respectively, to mold the hollow space 8 or the valve head 12, respectively, i.e. it is essentially (cup) backward extrusion or transverse extrusion, respectively. The preform 6 can also be molded directly from the blank 2 in a single forming step, e.g. forging or extrusion.

An axial length of the tubular wall 14 is enlarged in the next machining step, from FIG. 1e to FIG. 1d. "Axial" refers here to the direction defined by the tubular wall 14 (i.e. the later shaft), thus to the (central) axis of the tubular wall; "radial" is therefore a direction orthogonally to the axial direction. A length of the tubular wall 6 is thus measured in the axial direction.

For that purpose, flow forming or cylinder flow forming, respectively, for example, can be carried out via a flow forming mandrel 22. During the flow forming, the preform rotates and at least one flow forming roller 24, 26, which co-rotates due to frictional engagement, is pushed against the outer side of the tubular wall, and is moved in the axial direction, thus resulting in a plastic shape change. The incremental forming associated therewith leads to an advantageous cold working of the machined steel. As a whole, the wall thickness of the tubular wall decreases while the axial length of the tubular wall increases simultaneously. The at least one flow forming roller is optionally displaced several times in the axial direction until the desired length increase or wall thickness reduction, respectively, is reached. The radial distance of the at least one flow forming roller from the axis of the tubular wall is thereby successively reduced during consecutive passes.

Due to the used flow forming mandrel 22, the flow forming thus essentially leads to an elongation of the tubular wall 14, wherein the outer diameter thereof decreases slightly (according to the decrease of the wall thickness). If a larger decrease of the outer diameter is desired, a flow forming with several flow forming rollers can also take place without flow forming mandrel.

If dimensions of the preform 6 and parameters of the flow forming are selected such that the length of the tubular wall 14 attained by means of the flow forming, the outer diameter attained by means of the flow forming, and an inner diameter of the tubular wall 14 of the preform (which corresponds to a diameter of the flow forming mandrel) correspond to the desired dimensions of the hollow valve to he produced, a valve body 16 for a hollow shaft valve can be obtained in this way (see FIG. 1d, whereby it should be noted that the relative dimensions shown in the figures do not have to correspond to the actual relative dimensions, the diameter of the valve plate/head in relation to the shall diameter is in particular illustrated to be smaller in FIG. 1d than in the case of a common actual valve, the shaft diameter is likewise illustrated to be larger than usual in relation to the length of the shaft 20).

Finally (from FIG. 1d via FIG. 1e to FIG. 1f), the outer diameter of the tubular wall 14 is optionally reduced in order to obtain a finished valve body 18 for a poppet valve, the valve shaft 20 of which has a predetermined outer diameter, i.e. has a desired target diameter; see FIG. 1f. This forming step preferably takes place without inserted mandrel, so that the diameter can be decreased effectively. In addition to a reduction of the outer diameter, this step also leads to a further elongation of the tubular wall 14 and, if performed without mandrel, to an increase of the wall thickness of the tubular wall 14. The wall thickness should thus optionally be set somewhat smaller in the preceding flow forming step, in order to obtain a certain wall thickness in the final step in consideration of the thickness increase, and thus a certain inner diameter when given outer diameter D is given.

The reducing of the outer diameter of the tubular wall 14 can take place by means of rotary swaging or retracting ("necking", diameter decrease by means of constriction), wherein rotary swaging is preferred. In the case of the rotary swaging it is important that no further forming step of the valve body 18 for a poppet valve takes place after the rotary swaging for reducing the outer diameter of the tubular wall 14, because this would worsen the positive material properties obtained by the rotary swaging. Rotary swaging is thus the final forming step in this case.

The rotary swaging is an incremental pressure forming process, in the case of which the workpiece to be machined is struck in quick succession from different sides in the radial direction. Due to the pressure created thereby, the material quasi "flows", and the material structure is not distorted by tensile stresses. Rotary swaging is preferably carried out as cold forming method, i.e. below the recrystallization temperature of the machined material. It is thus an essential advantage of the use of rotary swaging as final forming step that compressive stresses are induced due to the radial application of force during the rotary swaging, as a result of which the appearance of tensile stresses, which increase the susceptibility to tears, is prevented, this applies in particular for the edge layers of the hollow shaft. The rotary swaging thus cooperates with the previous forming process of flow forming, which is likewise incremental, in an advantageous manner, so that optimal material properties, e.g. resistance, are attained.

Further advantages of the rotary swaging as final forming step, compared to drawing methods or "necking" (retracting), are at hand due to a better surface quality, which can be attained, and due to a relatively higher diameter reduction of the shaft for each step. Due to the high surface quality, which can be attained, and due to the fact that the tolerances, which can be observed during the rotary swaging, are very small, a finishing of the valve shaft is not necessary for the most part. Only an inferior surface quality or tolerance observation, respectively, can generally be achieved with free molding methods or compression methods, respectively, such as, e.g., necking. In particular no further method step should thus take place by means of a drawing method or necking after the rotary swaging to reduce the outer diameter of the tubular wall.

To conclude the production process of the hollow valve, a cooling medium, e.g. sodium, can furthermore be filled into the hollow space of the valve body via the end of the valve shaft, which is open to the outside, and this end of the valve shaft can subsequently be closed, e.g. by means of a valve shaft end piece, which is attached, for instance by means of friction welding or another welding method (not illustrated in the figures).

The reduction of the outer diameter can take place in several partial steps (an intermediate step is illustrated, for example, in FIG. 1e), wherein the individual partial steps can each optionally take place with or without mandrel (at the beginning of a partial step, the diameter of a mandrel can be smaller than the diameter of the hollow space); a diameter of the mandrels can also be reduced in consecutive partial steps.

Figure 2C:
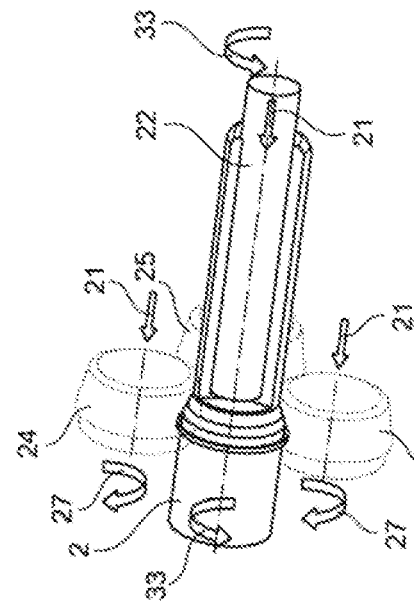
Figure 2A:
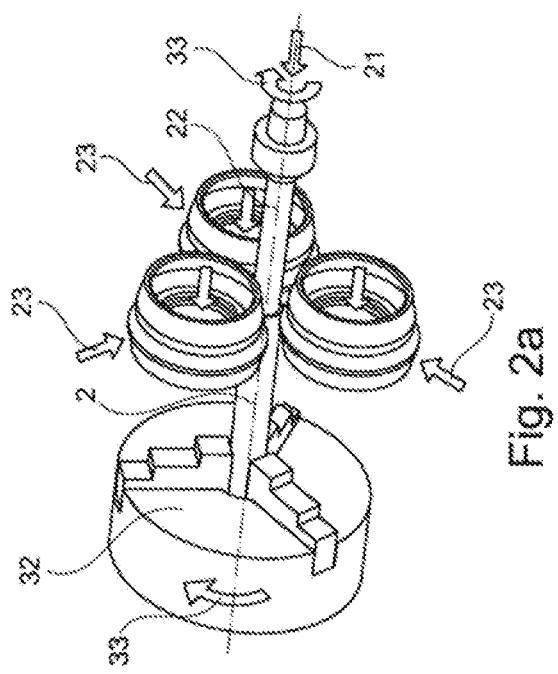

FIGS. 2a, 2b, and 2c illustrate the method steps of the spin extrusion, which takes place between FIG. 1a or FIG. 1b and FIG. 1c, in a 3D view.

In an optional first step, a cavity is introduced into the blank 2, at the point of the blank 2, at which the later hollow space 8 is to be created. This serves the purpose of attaching the molding die 22 to the blank 2, and to center it, or to simplify the following production step. A workpiece is thus created as semi-finished product 4, comprising a cavity, as illustrated in FIG. 1b. The workpiece for the spin extrusion can thus be a blank 2, which has not been machined, or a semi-finished product 4.

As shown in FIG. 2a, the workpiece 2, 4 is inserted into a tool holder 32 and is clamped in a spindle of a lathe or turning machine.

The actual step of the spin extrusion starts with the attachment of the molding die 22 (and of the flow forming rolls 24, 25, 26) centrally to the front side 3 of the workpiece 2, 4, as illustrated in FIGS. 2a and 2b (at an enlarged scale). Starting directly at the rod material 2, a preform 6 can thereby be manufactured in a single process step. This preform can then have a valve plate 12 and a valve shaft 20, comprising a reduced shaft diameter compared to the valve plate. The shaft diameter of this preform 6 can be larger than the shaft diameter of the finished valve.

To produce the preform 6, the spindle sets the workpiece 2, 4 into rotation 33 around its longitudinal axis. The molding die 22, which can also be referred to as pressing die or flow forming mandrel, can thereby co-rotate with the workpiece 2, 4, e.g., by means of a frictional engagement of by means of a drive. In the alternative, the molding die 22 can also not rotate, but only move axially. In the latter case, a high heat development is to be expected. If the three flow forming rollers 24, 25, 26 (synchronization flow forming rollers), which are arranged equidistantly to one another, are pushed against the side wall 14 of the workpiece 2, 4 by means of a radial force 23 to be applied, they start to rotate 27 around their axes (not around the axis of rotation of the spindle 33) due to frictional engagement. The direction of rotation 33 of the workpiece 2, 4, together with workpiece holder 32 and (optionally) molding die 22, and the direction of rotation 27 of the flow forming rollers 24, 25, 26, are suggested in the figure by means of curved arrows.

The assembly of molding die 22 and the flow forming rollers 24, 25, 26 are moved uniformly, synchronously in the axial direction in the direction of the spindle. In the alternative, the workpiece 2, 4 can be moved against the workpiece assembly. This results in a plastic deformation of the workpiece 2, 4. The flow forming rollers and the axially acting molding die work simultaneously. The molding die 22 thereby penetrates centrically into the workpiece and forms a tubular wall 14 of a cup, comprising an inner diameter, which corresponds to the outer diameter of the molding die 22. The outer diameter of the tubular wall 14 is limited by the flow forming rollers 24, 25, 26. In addition, they simultaneously perform a step of the draw-pressing/rolling. The excess, displaced material of the workpiece 2, 4 flows off, so that the length of the tubular wall 14 increases in the axial direction (backward extrusion of a cup-cup extrusion. The translatory direction of movement 21 of the molding die 22 and of the flow forming rollers 24, 25, 26 are suggested in the figure by means of arrows. The flow direction of the material of the tubular wall 14 is in the opposite direction.

The advantages of the cup extrusion and flow forming are advantageously combined in one step by means of the presented method of the spin extrusion. In other words: the steps of the extrusion of the preform 6 and of the drawing of the preform 6 are saved and are instead combined in one step of the spin extrusion process.

Three flow forming rollers 24, 25, 26 are illustrated in an exemplary manner in FIGS. 2, the use of only one, two, or more than three flow forming rollers is likewise possible. If several flow forming rollers are used, they are preferably distributed evenly over the circumference; i.e. in the case of two flow forming rollers, the angle (in the circumferential direction) between the flow forming rollers is approximately 180°, in the case of three flow forming rollers it is approximately 120°, etc. The preform 6 is thus in particular also supported in all directions, and transverse forces on the workpiece 2, 4 are avoided.

In an expanded assembly (not illustrated in the figures), there is a radial and an axial offset between the flow forming rollers 24, 25, 26. Radial offset means that the radial distance of the flow forming rollers 24, 25, 26 from the central axis is different. The axial offset of the flow forming rollers 24, 25, 26 has the result that the flow forming roll 24, which is closer to the workpiece, impacts on the workpiece 2, 4 first, and machines the latter, while flow forming rolls 25, 26 located farther away machine the workpiece later, in other words the points, which have already been machined by means of the previous flow forming roll 24. The thickness of the tubular wall 14 can thus be drawn gradually. The flow forming roller 24 located closest to the workpiece therefore has to have the largest radial distance, from the central axis, for the first drawing step, followed by that flow forming roller with the second-largest radial distance, etc. The process can be accelerated in this way because several radius or wall thickness reducing steps, respectively, can take place in one pass. Instead of a radial offset of flow forming rollers with the same diameter, flow forming rollers with different diameters can also be used.

In contrast, the omission of an axial offset of the flow forming rollers 24, 25, 26 (a radial offset would be pointless in this case), reduces transverse and torsional forces on the workpiece, which would be created by means of rollers, which push in an axially offset manner.

In the alternative, several sets (not illustrated) of flow forming rollers can also be arranged. The flow forming rollers of each set 24, 25, 26 are thereby arranged without offset. The sets are spaced apart in the axial direction, and each set effects a partial drawing of the workpiece 2, 4. Transverse and torsional forces on the workpiece compared to the flow forming with radial/axial offset are thus reduced/ avoided, and the advantage of gradual drawing and smaller flow forces in the material of the workpiece are nonetheless realized.

The result of the spin extrusion can be a semi-finished product 4 comprising a cup, which forms a hollow space 8 (see FIG. 1*b*). During this machining step, however, the valve head 12 can also be produced at the same time. For this purpose, the distance of the axes of rotation 27 of the flow forming rollers 24, 25, 26 from the axis of rotation 33 of the workpiece 2, 4 has to be capable of being set, so that the resulting thickness of the tubular wall 14 is variable during the axial shifting of the tool assembly, and a contour comprising valve head 12 (as shown in FIG. 1*c*) can be produced. It is important to note as a special feature thereby that the valve base 10 is produced either by cutting off the workpiece by means of a further tool (chisel), or optionally by means of a tight clamping of the workpiece, so that the valve base 10 results from the base of the workpiece. It is furthermore important to note that the molding die 22 should optionally no longer move synchronously with the flow forming rolls 24, 25, 26 on the last section, so as not to create a continuous hollow space 8 instead of a blind hole.

A high productivity, a good material utilization, a small expenditure of time during the production, a continuous forming process can advantageously be attained by means of the spin extrusion. Material savings of up to 99% can he attained compared to the deep drilling. An unwanted welding seam at the surface of the valve plate 12 is avoided at the same time.

Methods of the partial massive forming, such as the spin extrusion, are characterized in that the material is not plasticized in the entire forming volume, but in increments, which are limited by time and space. Compared to the cup backward extrusion, a reduction of the die force is possible for this reason, while approximately four times the length-diameter ratio can even be attained.

Due to the high hydrostatic pressure ratio, the method is suitable in particular for high-strength materials. Tools with a low shape memory are used during the spin extrusion.

What is claimed is:

1. A method for producing a valve body of a hollow valve, comprising the following steps:

providing a workpiece blank;

spin extruding the workpiece to create a preform, which has a cup comprising a hollow mold formed by a cup wall;

flow forming of the preform after the spin extrusion to provide a reduced shaft diameter, wherein, there is a radial and an axial offset between at least three flow forming rollers during the flow forming step, wherein a radial distance of the flow forming rollers from a central axis is different for each respective roller, wherein a first of the flow farming rollers first machines the workpiece, said first flow-forming roller having a largest radial distance from the central axis, followed by another second flow forming roller having a second-largest radial distance from the central axis.

2. The method according to claim 1, wherein a spin extruding stop is carried out by means of a molding die, which is pushed against the workpiece with an axial force, and wherein the at least three flow forming rollers are pushed onto the workpiece with ial force.

3. The method according to claim 2, wherein the preform has a valve headiplate and a valve shaft comprising a shaft diameter, which is reduced during flow forming compared to the valve plate.

4. The method according to claim 3, wherein the workpiece is received in a workpiece holder at a spindle and rotates around a longitudinal axis of the holder, and the molding die rotates synchronously to the spindle.

5. The method according to claim 4, wherein the at least three flow forming rollers and the molding die synchronously carry out an axial movement.

6. The method according to claim 1, wherein the method is carried out as cold, warm, or hot forming.

7. The method according to claim 1, wherein the cross section of the hollow mold is circular or has a follower profile, selected from ellipsis, polygon, or axially oriented multiple spline and toothing profiles.

8. The method according to claim 1, wherein forming of the valve head takes place by means of extrusion or forging of the valve head after the spin extrusion in a further process step.

* * * * *